US008200699B2

(12) United States Patent
Abdo et al.

(10) Patent No.: US 8,200,699 B2
(45) Date of Patent: *Jun. 12, 2012

(54) SECURED AND FILTERED PERSONAL INFORMATION PUBLISHING

(75) Inventors: Ralph Abdo, Sammamish, WA (US); Darrin N. Hatakeda, Redmond, WA (US); Eric F. Wong, Bellevue, WA (US); Theodore L. Michel, Bellevue, WA (US); Cameron Stillion, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 436 days.

This patent is subject to a terminal disclaimer.

(21) Appl. No.: 11/291,448

(22) Filed: Dec. 1, 2005

(65) Prior Publication Data

US 2007/0130221 A1 Jun. 7, 2007

(51) Int. Cl.
G06F 17/30 (2006.01)

(52) U.S. Cl. ........ 707/787; 709/202; 709/204; 709/205; 709/207; 345/853; 345/736

(58) Field of Classification Search ........................ None
See application file for complete search history.

(56) References Cited

U.S. PATENT DOCUMENTS

| | | | |
|---|---|---|---|
| 6,018,343 A | 1/2000 | Wang et al. | 715/733 |
| 6,105,132 A | 8/2000 | Fritch et al. | 713/167 |
| 6,202,066 B1 | 3/2001 | Barkley et al. | 707/9 |
| 6,357,010 B1 | 3/2002 | Viets et al. | 713/201 |
| 6,369,840 B1 | 4/2002 | Barnett et al. | 715/853 |
| 6,603,489 B1 * | 8/2003 | Edlund et al. | 715/780 |
| 6,604,079 B1 | 8/2003 | Ruvolo et al. | 705/9 |
| 6,735,586 B2 * | 5/2004 | Timmons | 707/3 |
| 6,823,357 B1 | 11/2004 | Du et al. | 709/203 |
| 7,870,194 B2 | 1/2011 | Michel | 709/204 |
| 8,055,992 B2 | 11/2011 | Raff | 715/203 |
| 2001/0044810 A1 * | 11/2001 | Timmons | 707/513 |
| 2001/0049617 A1 | 12/2001 | Berenson et al. | 705/8 |
| 2002/0023132 A1 | 2/2002 | Tornabene | 709/205 |
| 2002/0078070 A1 | 6/2002 | Eshelman et al. | 1/1 |
| 2002/0154178 A1 * | 10/2002 | Barnett et al. | 345/853 |
| 2002/0174372 A1 | 11/2002 | Venkataraman | 713/400 |
| 2003/0069874 A1 | 4/2003 | Hertzog | 707/1 |
| 2003/0154116 A1 | 8/2003 | Lofton | 705/8 |
| 2003/0229624 A1 * | 12/2003 | Petrisor et al. | 707/3 |
| 2004/0044646 A1 * | 3/2004 | Hullot et al. | 707/1 |
| 2004/0109025 A1 * | 6/2004 | Hullot et al. | 345/764 |
| 2004/0122915 A1 * | 6/2004 | Saare et al. | 709/218 |
| 2004/0267625 A1 * | 12/2004 | Feng et al. | 705/26 |
| 2005/0027805 A1 | 2/2005 | Aoki | 709/206 |

(Continued)

OTHER PUBLICATIONS

QUT, Division of Technology, Information and Learning Support, "MS Outlook 2003 Calendar Quick Reference Guide," retrieved from www.archive.org on Nov. 22, 2005, pp. 1-7.*

(Continued)

*Primary Examiner* — Farhan Syed
(74) *Attorney, Agent, or Firm* — Merchant & Gould

(57) ABSTRACT

Selectively shared and filtered personal information collections are provided. Personal information collections include calendars, task lists, address books, and other collections of information that may be provided by personal information manager (PIM) software. Personal information collections published on a server may be limited on a user-by-user basis as to who may access the collections. Furthermore, collections may be automatically filtered based on a rolling window of dates, reducing file size and maintaining privacy of items outside the rolling window.

17 Claims, 6 Drawing Sheets

U.S. PATENT DOCUMENTS

| | | | | |
|---|---|---|---|---|
| 2005/0038690 | A1* | 2/2005 | Hayes-Roth | 705/9 |
| 2005/0039142 | A1 | 2/2005 | Jalon et al. | 715/823 |
| 2005/0044061 | A1* | 2/2005 | Klemow | 707/1 |
| 2005/0091120 | A1 | 4/2005 | Auletta | 705/26 |
| 2005/0114756 | A1* | 5/2005 | Lehikoinen et al. | 715/501.1 |
| 2005/0144312 | A1 | 6/2005 | Kadyk | 709/237 |
| 2005/0278641 | A1* | 12/2005 | Mansour et al. | 715/749 |
| 2006/0045029 | A1 | 3/2006 | Ethier et al. | 370/260 |
| 2006/0200374 | A1 | 9/2006 | Nelken | 705/9 |
| 2006/0282272 | A1 | 12/2006 | Urasaki et al. | 705/1.1 |
| 2007/0027930 | A1* | 2/2007 | Alvarado et al. | 707/200 |
| 2007/0070940 | A1 | 3/2007 | Vander Veen et al. | 370/328 |
| 2007/0129986 | A1* | 6/2007 | Barnett et al. | 705/8 |
| 2007/0162646 | A1 | 7/2007 | Maitland et al. | 710/22 |
| 2007/0294370 | A1 | 12/2007 | Fay et al. | 709/219 |
| 2008/0091499 | A1 | 4/2008 | Barber-Mingo et al. | 705/9 |
| 2008/0133641 | A1* | 6/2008 | Gent et al. | 709/201 |
| 2011/0137992 | A1 | 6/2011 | Michel | 709/204 |
| 2011/0314383 | A1 | 12/2011 | Abdo | 707/102 |

OTHER PUBLICATIONS

"iCal Exchange", http://www.icalx.com/passwords.php.

Microsoft Office Online, Microsoft Office Assistance: Managing Internet Free/Busy Information, "Workgroup Technologies", http://office.microsoft.com/en-us/assistance/HA011364901033.aspx.

Apple—iCal—Share online, "Share your calendars online", http://www.apple.com/lae/ical/share.html.

Mustacoglu, Ahmet F.; Wu, Wenjun; Fox, Geoffrey, "Internet Calendaring and Scheduling Core Object Specification (Icalendar) Compatible Collaborative Calendar-Service (CCS) Web Service", Community Grids Lab, Indiana University, Bloomington, IN, Department of Computer Science, Indiana University, pp. 1-6. http://grids.ucs.indiana.edu/tliupages/p;ublications/AhmetFatihMustacoglu_CTS2006.pdf#search=%22Internet%20Calendaring%20and%20Scheduling%20Core%20Object%20Specification%20%22.

"OfficeCalendar for Microsoft Outlook 2.3.2.0", Publisher's Description, pp. 1-2. Oct. 7, 2006. http://officecalendar-for-microsoft-outlook.lookout-software-ltd.qarchive.org/.

International Search Report mailed Apr. 25, 2007, in Application No. PCT/US2006/046224.

Office Action issued Dec. 4, 2009, in CN Pat. Application No. 200680045306.2, w/Translation.

Office Action issued Jun. 29, 2010, in CN Pat. Application No. 200680045306.2, w/Translation.

U.S. Appl. No. 12/959,857, filed Dec. 3, 2010, entitled "Sharing Calendar Information".

Office Action mailed Apr. 10, 2009, in U.S. Appl. No. 11/598,866.

Office Action mailed Nov. 13, 2009, in U.S. Appl. No. 11/598,866.

Office Action mailed Dec. 23, 2009, in U.S. Appl. No. 11/598,866.

Office Action mailed May 3, 2011, in U.S. Appl. No. 12/959,857.

"iCal Exchange", http://www.icalx.com/passwords.php, 2005.

Microsoft Office Online, Microsoft Office Assistance: Managing Internet Free/Busy Information, "Workgroup Technologies", http://office.microsoft.com/en-us/assistance/HA011364901033.aspx, 2005.

Apple-iCal-Share online, "Share your calendars online", http://www.apple.com/lae/ical/share.html, 2005.

OL2000: (IMO) How to Use the Internet Free/Busy Feature, http://support.microsoft.com/kb/196484/.

Lisa Dusseault, et al., IEEE Internet Computing, "Open Calendar Sharing and Scheduling with CalDAV", Mar./Apr. 2005.

Office Action mailed Nov. 17, 2011, in U.S. Appl. No. 12/959,857.

Office Action mailed Dec. 16, 2011, in U.S. Appl. No. 13/222,431.

Mustacoglu, Ahmet F.; Wu, Wenjun; Fox, Geoffrey, "Internet Calendaring and Scheduling Core Object Specification (Icalendar) Compatible Collaborative Calendar-Service (CCS) Web Service", Community Grids Lab, Indiana University, Bloomington, IN, Department of Computer Science, Indiana University, pp. 1-6, 2006.

* cited by examiner

SECURED AND FILTERED PERSONAL INFORMATION PUBLISHING

BACKGROUND

The secure sharing of personal information among groups of individuals has long been a problem confronted by software developers. The challenge has been to enable an individual to publish information such that only specific individuals can access specific parts of the information. To some extent client-server software has enabled limited solutions to this challenge. One example is Microsoft's OUTLOOK personal information manager (PIM) client software combined with Microsoft's EXCHANGE SERVER software. This combination has enabled millions of individuals to share their information within workgroups, most commonly in a corporate or workplace environment.

The needs of users, however, are not limited to the workgroup or company setting. Frequently, users wish to share collections of personal information with a broader audience outside their workplace or organization. Examples include the sharing of a task list, a calendar of events, or a group of contacts (i.e. an address book). If a user wishes to share a calendar (e.g., upcoming football practices) with an audience outside his or her organization, the user must rely on technologies other than classic client-server software, technologies such as the Internet to allow access by other users.

Some solutions have been created which partially solve this problem. For example, calendar programs exist which can upload (publish) and download (subscribe to) calendars from servers attached to a network such as the Internet. These programs may use an Internet publishing standard such as Web-based Distributed Authoring and Versioning (WebDAV) to control publishing a calendar. Such programs, however, may not provide the ability to secure and filter the information available to others via the Internet.

Existing calendar solutions publish calendars without desirable restrictions. An entire calendar must typically be published, and calendars are frequently protected using a simple password protection scheme. Although somewhat secure, having a single password for a calendar makes it difficult to select who can and can't view the calendar on a person-by-person basis. For example, if three users are provided access to a published calendar by sharing the password with each of them, and one of the three subsequently has his access revoked, the publisher of the calendar must change the password and alert only the two remaining users of the change. Also, the password could be passed to others allowing them access to the information. Having a single password also makes it difficult to track who is accessing a calendar, and which person may have leaked the password to others. The single password may also be sent via insecure email and be subject to the prying eyes of others.

Furthermore, when publishing events or task items, the entire collection is published. This can be cumbersome for both the publisher and the users of the collection. Even though a few months or weeks of information may be relevant, the entire collection must be published each time there is a change. As an example, for a particularly large calendar stretching over a period of years, this may unnecessarily lengthen the amount of time to upload or download the calendar. In addition, the large calendar may take up too much memory and/or disk space on a server. Moreover, publishers may wish to limit the time period of calendar events published so that tentative future events remain unpublished.

There is a need in the art for the ability to publish a calendar to a server, such that the information published can be filtered, the access granted can be restricted on a user-by-user basis, and the granularity of data viewable by a user can be controlled. For example, a user may want to only give free/busy information to one person, while allowing another person to see the text of each appointment.

SUMMARY

One or more embodiments provide a method for securely sharing a personal information collection (e.g., a calendar, a task list, or an address book) via a server. A publisher can specify individuals who will have access to the calendar (or other collection) and may also limit the period of time which can be viewed on a calendar by invited users.

Additional embodiments provide a method for receiving and sharing a personal information collection (e.g., a calendar or task list) on a server. The server receives the personal information collection, along with an indication of an audience authorized to view the collection. The server then requires that users requesting to view the collection be authenticated prior to allowing access.

BRIEF DESCRIPTION OF THE DRAWINGS

The foregoing brief summary of the invention, as well as the following detailed description, is better understood when read in conjunction with the accompanying drawings, which are included by way of example, and not by way of limitation with regard to the claimed invention. In the accompanying drawings, the same or similar elements are labeled with the same reference numbers.

DETAILED DESCRIPTION

Information contained in PIM software 120 may be published using a "rolling window" of time in which information is published or withdrawn from view, ensuring that subscribers to the information do not view irrelevant or tentative information. Furthermore, the information can be secured on a user-by-user basis over a network such as the Internet in order to ensure that unauthorized viewers cannot access the information.

Figure 1:
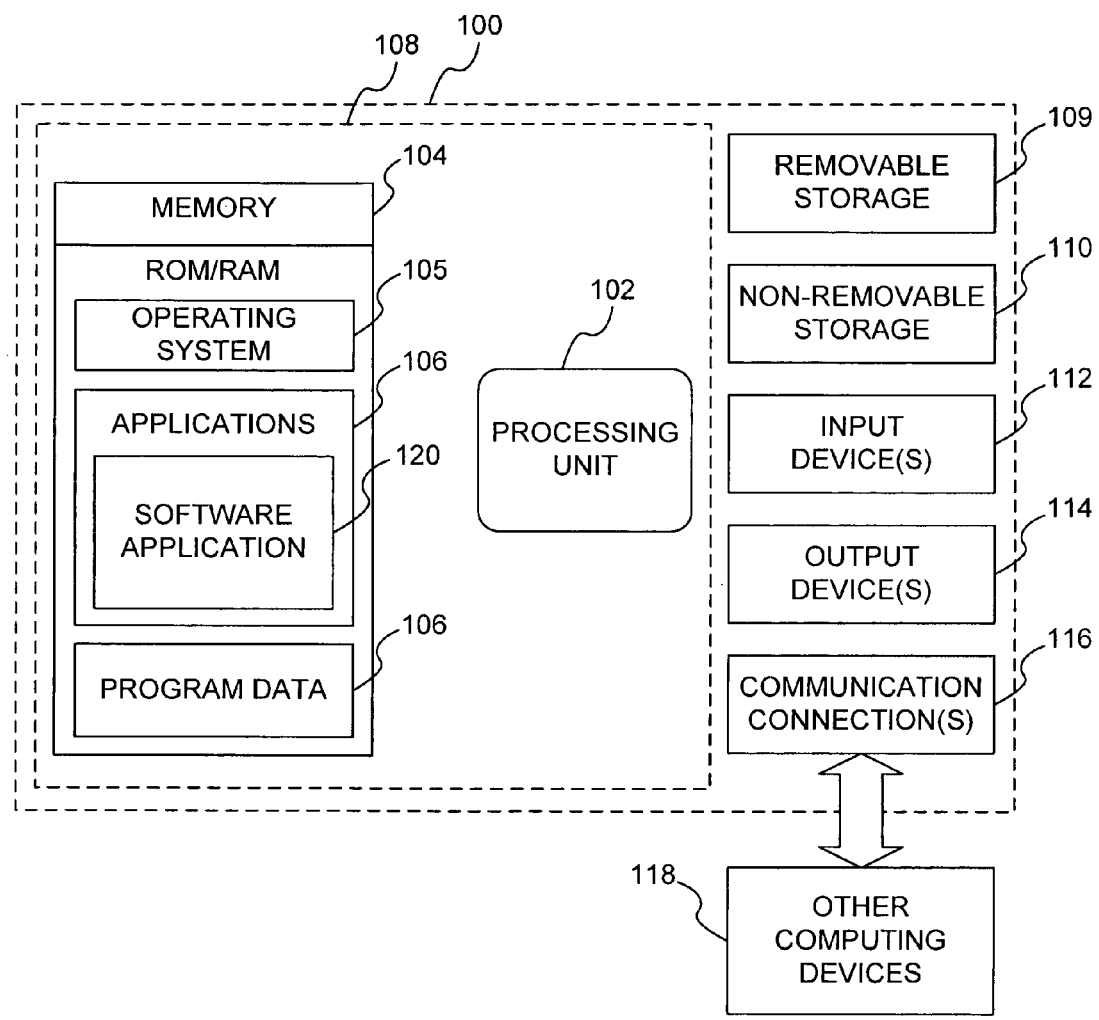
FIG. 1 depicts an exemplary operating environment in which one or more embodiments may be implemented.

FIG. 1 depicts an exemplary operating environment in which one or more embodiments may be implemented. The operating environment may comprise computing device 100 which may work alone or with other computing devices 118. Computing device 100 may comprise memory storage 104 coupled to processing unit 102. Any suitable combination of hardware, software, and/or firmware may be used to implement memory 104, processing unit 102 and other components. By way of example, memory 104, processing unit 102, and/or other components may be implemented within computing device 100 as shown, or may be implemented in combination with other computing devices 118. The systems, devices, and processors shown are used merely as examples.

Generally, program modules may include routines, programs, components, data structures, and other types of structures that perform particular tasks or implement particular abstract data types. Moreover, embodiments may be practiced with other computer system configurations, including hand-held devices, multiprocessor systems, microprocessor-based or programmable consumer electronics, minicomputers, mainframe computers, set-top boxes, and so forth. Embodiments may also be practiced in distributed computing environments where tasks are performed by other computing devices 118 that are linked through a communications network. In a distributed computing environment, program modules may be located in both local and remote memory storage devices.

Embodiments, for example, may be implemented as a computer process or method (e.g., in hardware or in software), a computing system, or as an article of manufacture, such as a computer program product or computer readable media. The computer program product may be a computer storage media readable by a computer system and encoded with a computer program of instructions for executing a process on computing device 100. The computer program product may also be a propagated signal on a carrier readable by a computing system and subsequently stored on a computer readable medium on computing device 100.

With reference to FIG. 1, the embodiment shown may include a computing device, such as computing device 100. In a basic configuration, computer device 100 may include at least one processing unit 102, and memory 104. Depending on the configuration of the computer device, memory 104 may be volatile (e.g., Random Access Memory (RAM)), non-volatile (e.g., Read-Only Memory (ROM), Flash, etc.), or some combination thereof. Memory 104 may serve as a storage location for operating system 105, one or more applications 106, and may include program data 107, as well as other programs. Examples of operating system 105 are found in the family of WINDOWS operating systems from MICROSOFT CORPORATION of Redmond, Wash. In one embodiment, applications 106 may include personal information manager (PIM) software 120, such as MICROSOFT OUTLOOK.

Although the basic computing device configuration is contained within dashed-line box 108, computing device 100 may include additional features and functionality. For example, computing device 100 may include additional data storage components, including both removable storage 109 (e.g., floppy disks, memory cards, compact disc (CD) ROMs, digital video discs (DVDs), external hard drives, universal serial bus (USB) keys, etc.) and non-removable storage 110 (e.g., magnetic hard drives).

Computer storage media may include media implemented in any method or technology for storage of information, including computer readable instructions, data structures, program modules, or other data. Memory 104, removable storage 109, and non-removable storage 110 are all examples of computer storage media. Further examples of such media include RAM, ROM, electrically-erasable programmable ROM (EEPROM), flash memory, CD-ROM, DVD, cassettes, magnetic tape, magnetic disks, and so forth. Any such computer storage media may be accessed by components which are a part of computing device 100, or which are external to computing device 100 and connected via a communications link (e.g., Bluetooth, USB, parallel, serial, infrared, etc.). Computing device 100 may also include input devices 112, such as keyboards, mice, pens, microphone, touchpad, touch-display, etc. Output devices 114 may include displays, speakers, printers, and so forth. Additional forms of storage, input, and output devices may be utilized.

Computing device 100 may also include one or more communication connections 116 which allow the computing device to communicate with other computing devices 118, such as over a network (e.g., a local area network (LAN), the Internet, etc.). Communication media, in the form of computer readable instructions, data structures, program modules, or other data in a modulated data signal, may be shared with and by device 100 via communication connection 116. Modulated data signal may mean a signal that has one or more of its characteristics set or changed in such a manner as to encode information in the signal, and may include a modulated carrier wave or other transport mechanism. Communication connection 116 may be comprised of hardware and/or software enabling either a wired (e.g., Ethernet, USB, Token Ring, modem, etc.) or wireless (e.g., WiFi, WiMax, cellular, acoustic, infrared, radio frequency (RF), etc.) communication conduit with other devices 118.

Figure 2:
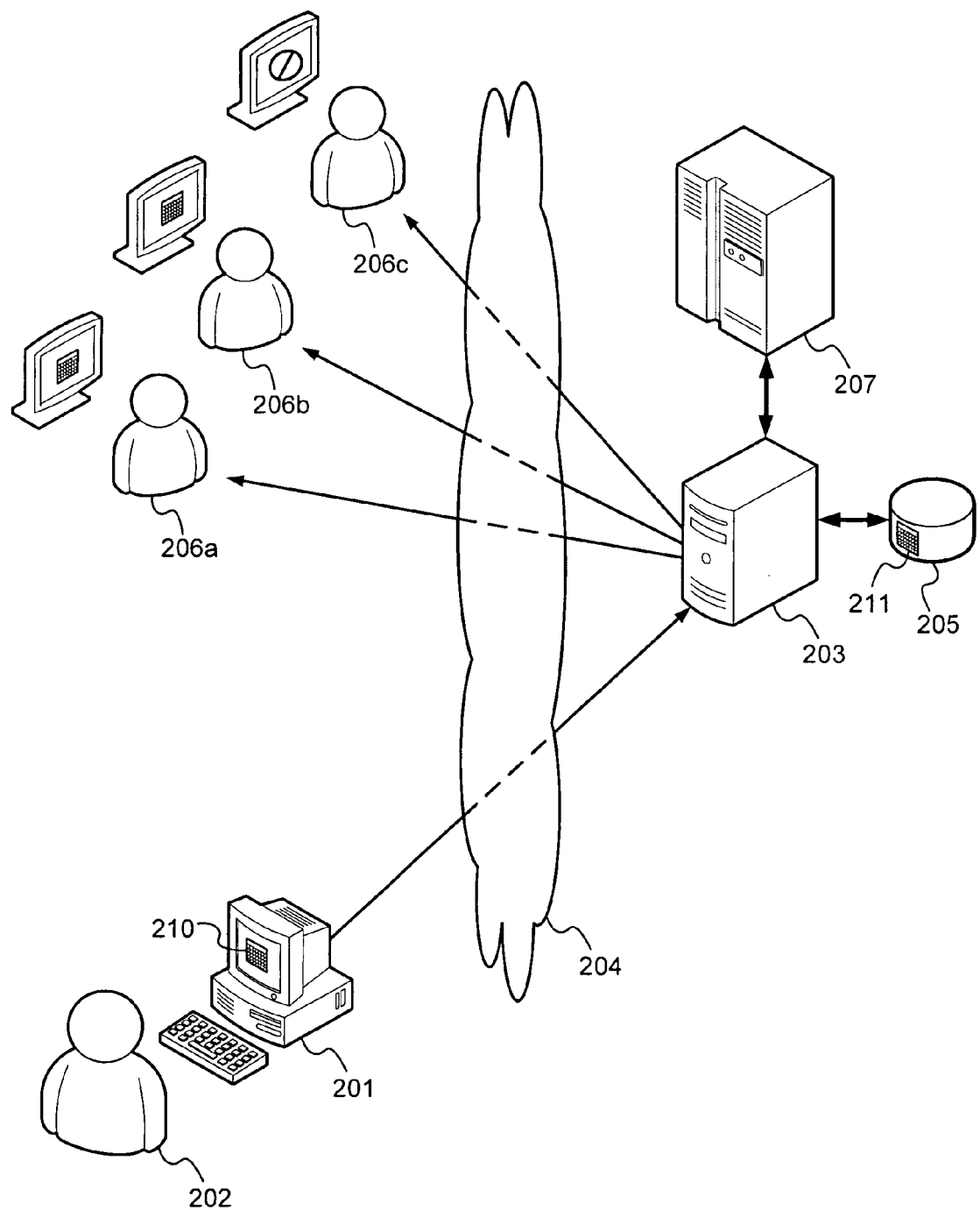
FIG. 2 is a system diagram depicting the process of publishing a personal information collection on a server for secure access according to one or more embodiments of the invention.

FIG. 2 is a system diagram depicting the process of publishing a personal information collection (i.e. a calendar) 210 on a server 203 for secure access according to one or more embodiments of the invention. Computer 201 is an example of computing device 100 set forth in FIG. 1. Computer 201 runs some type of personal information manager software 120, which includes calendar 210. When publishing user 202 opts to publish calendar 210, a publishable form of the calendar is sent to server 203 via network 204. Server 203 may comprise a server on a local area network, or a remote server contacted via the Internet. Server 203 may store calendar 210 as published calendar 211 in storage 205 (e.g., a hard drive associated with server 203).

Calendar 210 may be sent in a standard format such as the Internet Engineering Task Force's iCalendar standard. Software on computer 201 may store information utilizing the same standard format as used for publication, or store the information in a different standard or proprietary format that is converted to a standard for publication. In addition to sending calendar event information, software on computer 201 may also send access and control information, describing who can and cannot access published calendar 211. Such information may be sent in a standard format (e.g., access & control (ACL)), or in a proprietary format. The access information sent may include a collection of email addresses and/or user names of individuals who are permitted to access published calendar 211.

Users 206a, 206b, and 206c each wish to access published calendar 211. Each attempts to access the calendar via a network-connected computer. Since publisher 202 opted to limit access to specific individuals, each user will have to establish his or her identity before the information can be accessed. In establishing each user's identity, server 203 and/or clients 206 may take advantage of authentication service 207, which may work locally on server 203, or remotely over a network 204 such as the Internet. An authentication service 207, such as MICROSOFT'S PASSPORT NETWORK, can authenticate and establish an identity for each user 206.

When user 206 attempts to access calendar 211 on server 203, he or she may be challenged to authenticate his or her identity, and subsequently be provided credentials establishing identity and allowing access to the information. Alternative authentication schemes need not require the services of remote authentication service 207. Including a simple login and password setup for each user on server 203 can accomplish the same goal. Here, users 206a and 206b have successfully been authenticated, and subsequently have accessed calendar 211. User 206c has not been authenticated and cannot access the information. Alternatively, user 206c may be authenticated (have his identity established) but not be authorized to access calendar 211. Should publisher 202 ever decide to exclude user 206b, she need only modify access restrictions for that particular user rather than change a single password for all users, and informing the remaining users of the new password.

Server 203 may be set up as a server uniquely providing secured sharing services for the PIM software 120 running on computer 201. Alternatively, server 203 may be a generic web server programmed to share information and provide secured access to the information. In utilizing the services of server 203, a publisher of information 202 may first need to register, pay for the services, and/or pay to upgrade a service level.

Figure 3:
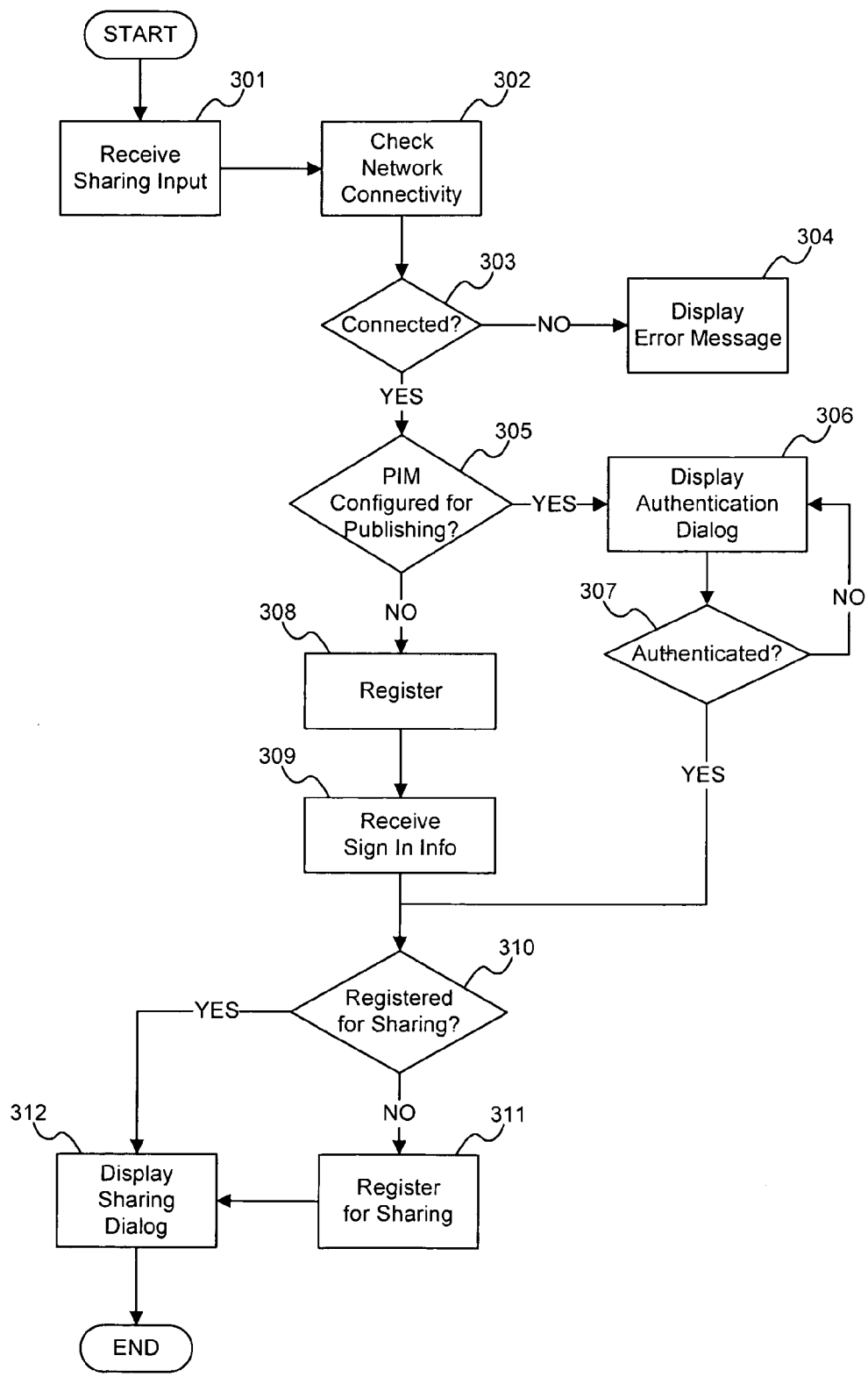
FIG. 3 is a flowchart depicting a process for registering for a service for sharing personal information collections according to one or more embodiments of the invention.

FIG. 3 is a flowchart depicting a process for registering for a service for sharing personal information collections according to one or more embodiments of the invention. Steps portrayed in the flowchart may be reordered, skipped, combined with other steps, or otherwise modified, and yet the general process will remain constant. Here, at step 301, publisher 202 indicates to PIM software 120 that she wants to share a calendar selectively. This may be accomplished by clicking a Publish button on an interface, selecting a menu item, or otherwise providing input indicating a desire to share a personal information collection such as a calendar or task list.

For computer 201, once sharing is triggered, network connectivity is checked at step 302. If at decision 303, there is no network connection to enable publishing, then at step 304, an appropriate error message is displayed. If a network connection is present, then at step 305, PIM software 120 is checked to see if it is configured for publishing (e.g., with the server information, etc.). If the software is so configured, then at step 306, an authentication dialog is optionally displayed for the publisher to verify his or her identity. Once authenticated, at decision 307, the steps can proceed, otherwise the publisher will have to re-authenticate, or cancel the operation. If the PIM software 120 is not configured to utilize publishing, then the publisher is provided an opportunity to register and/or pay to utilize a publishing service at step 308. At step 309, the new user receives their sign in information, and control proceeds.

Once authenticated, the publisher's registration is checked at decision 310 to see if she has already signed up for the specific sharing service required (e.g. calendar sharing, if it is provisioned separately from the publishing service generally). If not at step 311, the user can register for sharing, and at step 312, a sharing dialog can be displayed where a user can configure options for sharing the particular collection selected.

Figure 4:
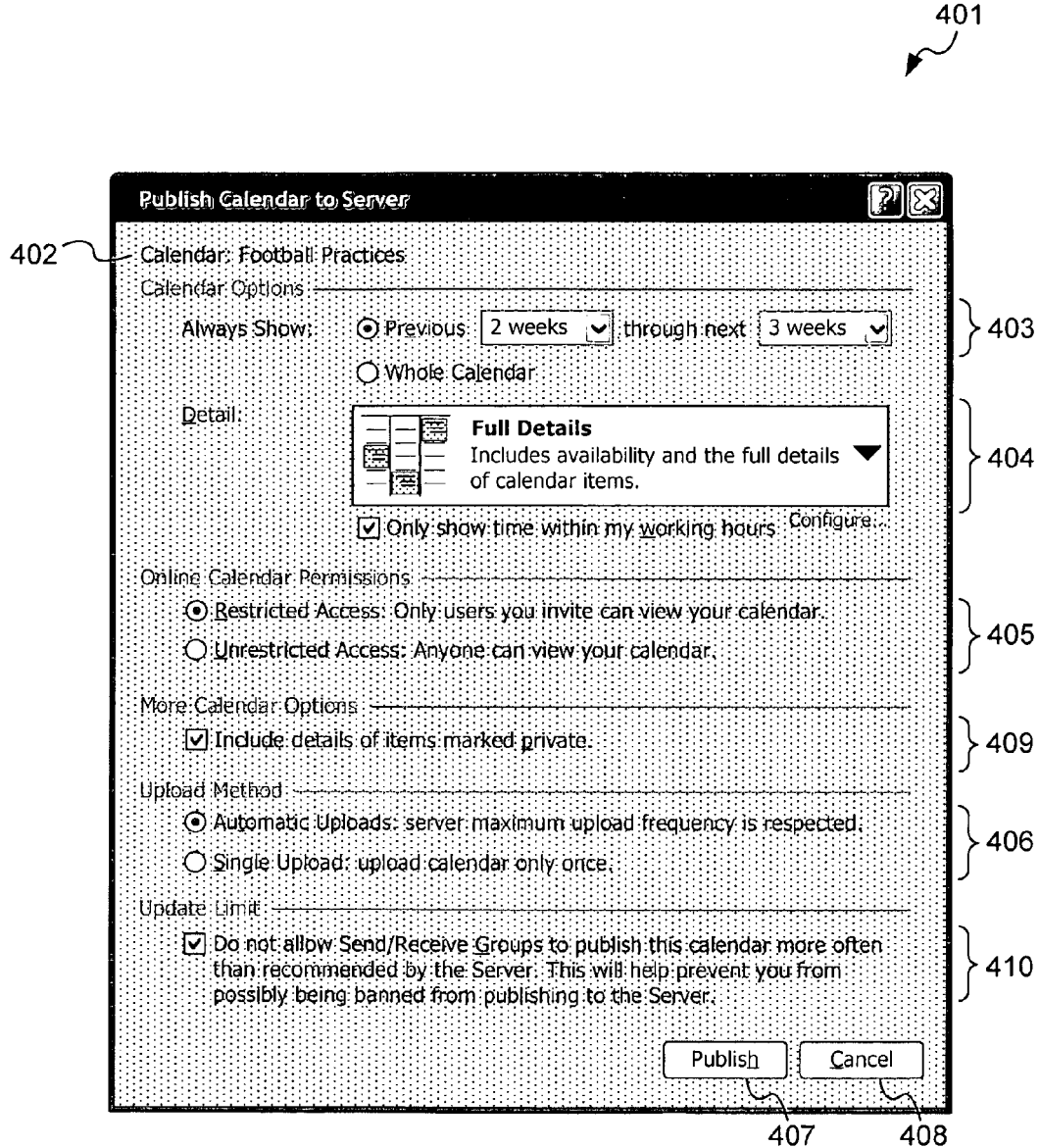
FIG. 4 depicts a dialog 401 for configuring the sharing of a calendar according to one or more embodiments of the invention.

FIG. 4 depicts a dialog 401 for configuring the sharing of a calendar according to one or more embodiments of the invention. Similar dialogs may be used for other types of personal information collections, including task lists, address books, note collections, and so forth. It should be noted that this dialog is merely an example. Other dialogs may solicit the same information using different input types, and the dialog may be part of a larger form or input area.

Dialog 401 provides publisher 202 with the ability to configure publication options for a calendar named Football Practices 402. The published version of the calendar will not include all events, but instead will include a limited time range of events, one that varies based on the current date. Input 403 permits the selection of an amount of time prior and following the current date to be displayed on the published calendar. In the case of a task list, publication of the collection item (a task versus an event) may be similarly filtered using the item's due date. Here, events falling within the range of 2 weeks prior to the current date and 3 weeks after the current date will be published.

Input 404 allows publisher 202 to select how much information about each event will be included on the published calendar. At a minimum, availability information is provided (e.g., whether a particular time period has an event), while the other end of the spectrum provides all details about events. As an example, "Full Details" may include all information about an event including whatever description has been entered. "Partial Details" may only include date, time, title, and location, without any additional information. Publisher 202 may also filter for showing only those events that occur during previously determined work hours. Calendar permissions can be controlled using input 405, to permit only certain users, or to allow all users. And uploading can be selected for automatic or manual using input 406. Input 409 can allow the details of events marked "private" to be published for others to access. Input 410 may allow the PIM software to honor upload limits of server 203 in order to prevent excessive use of bandwidth and/or memory. Once the appropriate options are configured, a user may publish the calendar immediately by clicking Publish button 407, or exit without publishing by clicking Cancel button 408.

Once options for calendar publication have been set, and a publisher has selected to restrict access to individual users, publisher 202 may be presented with a dialog (not shown) for inviting users to access his calendar. Such a dialog may also allow for each invited user to be restricted as to a level of access to the calendar. Some users may be able to access the full details of events, whereas others may simply be able to access whether or not an event occurs at a particular time (e.g., free/busy information). A publisher may be provided a template email into which she can insert contacts from her address book, or simply email addresses of those to be authorized to view the calendar. These individuals may then be sent an email with a link to the calendar. When clicking the link, these invited users may need to first be authenticated by server 203, or authentication service 207. Subsequent to the initial set of invitations, publisher 202 may modify the access settings for the calendar, inviting additional users, and revoking access for others.

Figure 5A:
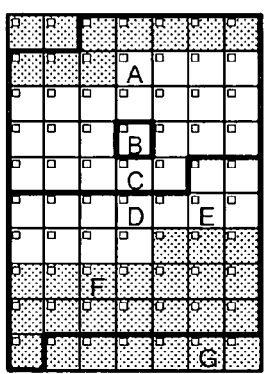
FIGS. 5A-5C depict the selective publication and non-publication of a personal information collection according to one or more embodiments of the invention.
Figure 5A:
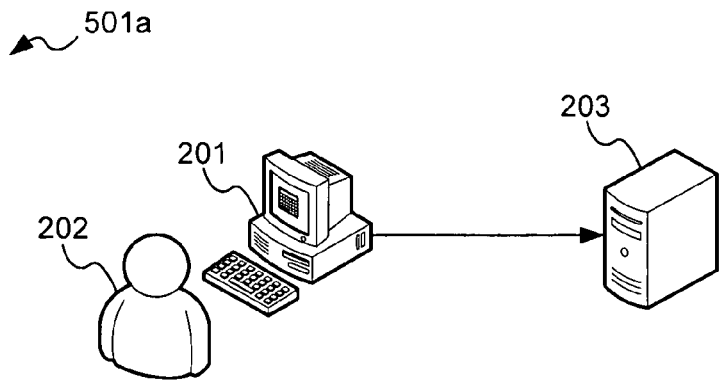
Figure 5B:
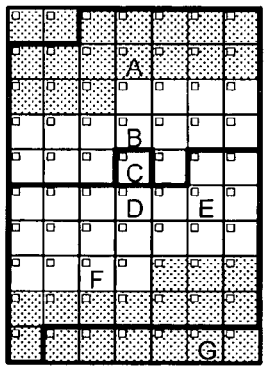
Figure 5B:
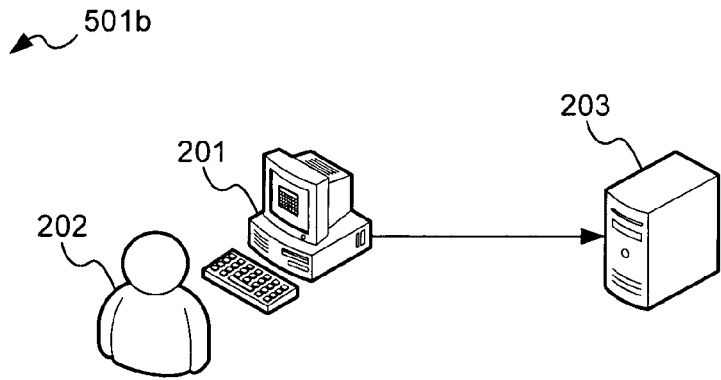
Figure 5C:
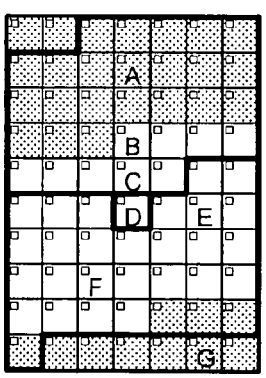
Figure 5C:
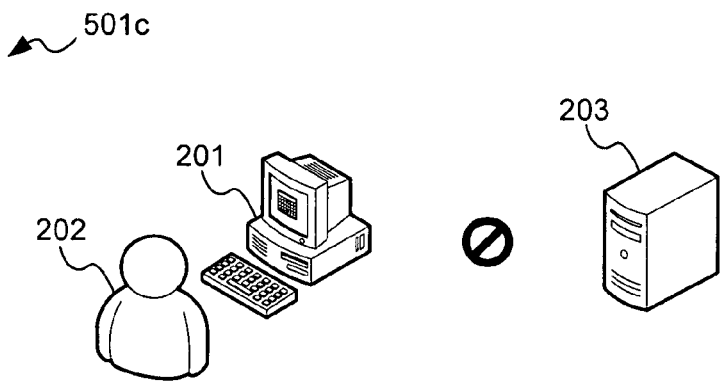

FIGS. 5A-5C depict the selective publication and non-publication which occurs each time a publication request (e.g., a send/receive cycle) is made. Here, publisher 202 has selected that a calendar (or for example, a task list) will only publish for a certain "rolling window" date range (2 weeks prior and 3 weeks after the current date), and the user has selected automatic updates. As such, the calendar will be republished only on an as needed basis, and only when publication is triggered (e.g., after a certain period of time, upon manual publication, etc.).

FIG. 5A depicts calendar 501a having events A-G scheduled on various dates. The current day is highlighted with a box (i.e. "B" day). The unshaded portion of the calendar represents the "rolling window" or two weeks prior to the current date and three weeks following the current date. When publishing this calendar, only events A-E will be published from computer 201 to server 203, as these are the only events which fall during the window.

FIG. 5B depicts the calendar 501b, the same as before, except that now the current date has advanced by a week. Although automatic publication is more likely to update the calendar on a more frequent basis, for purposes of this example, the calendar has not been published over the current week. The rolling window (i.e. the unshaded region) has advanced appropriately, and now computer 201 determines whether or not the calendar needs to be republished. Since event A has fallen outside the window, and event F now falls within the window, the calendar will be re-published, this time with only events B-F listed.

FIG. 5C depicts calendar 501*c*, with the current date advanced by yet another week. The rolling window has again advanced, and computer 201 must again determine whether to republish the calendar. Although there has been a shift of a week in the window, the events appearing within the window have not changed. Events B-F should still be listed on the calendar. Assuming that no other changes have been made to the content of the calendar, the calendar will not be re-published this time. Because the events are the same, then the calendar is the same, and republishing would be a waste of resources and time, especially for server 203 which may potentially be shared by multiple publishers.

Figure 6:
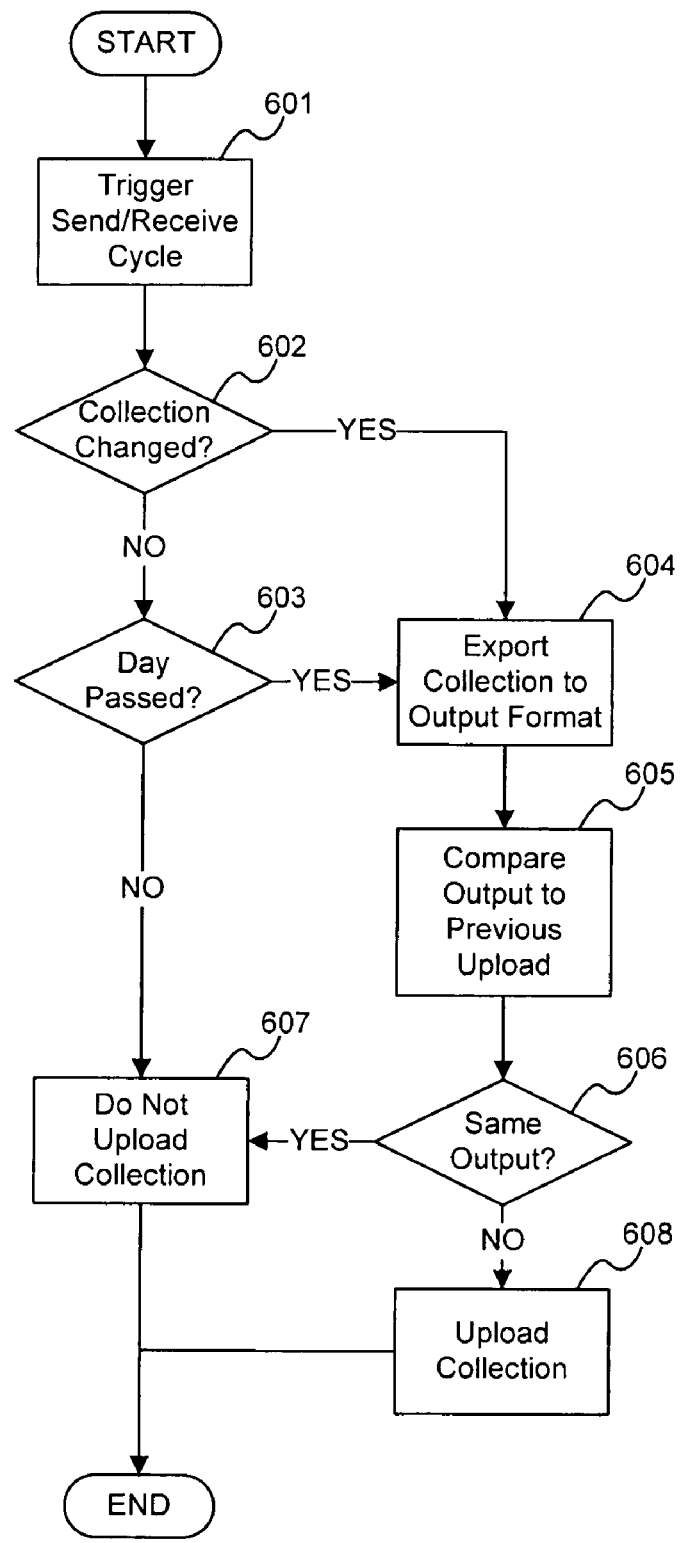
FIG. 6 is a flowchart showing a method for determining whether to republish a personal information collection according to one or more embodiments of the invention.

FIG. 6 is a flowchart showing a method for determining whether to republish a personal information collection (e.g., a task list, or a calendar) according to one or more embodiments of the invention. At initial step 601, a send/receive cycle is triggered. This may be triggered automatically based on configuration settings (e.g., a certain period of time passes, or a certain percentage of information has changed) or triggered manually by a user. As a part of a send/receive cycle, published information collections may be checked to see if they require republication. The first check, at decision 602, is to see if the publisher changed the personal information collection since the most recent publication. The second check, at decision 603, is to see if a calendar day has passed since the previous publication.

If either of these checks is true, then at step 604, a publishable version of the collection will be created. The publishable version may conform to a particular standard (e.g., a calendar to the iCalendar specification), and also may honor any filters put in place by the user (e.g., a rolling time window, or business hour events only). At step 605, the just-generated publishable version is compared to the publishable version previously published. This comparison may involve an event by event analysis and/or may involve the comparison of hash values (e.g. CRC or MD5) to determine if the two files are the same. If, at decision 606, the two publishable versions are the same (e.g., no events within the rolling window have been changed, added, or removed, and therefore the files are identical), then at step 607, the publishable version of the collection will not be uploaded to server 203. If the publishable versions are different (e.g., events within the rolling window have changed), then at step 608, the newly generated publishable version of the personal information collection will be uploaded. At this point, users who subscribe to the calendar may receive notification of the change, or automatically receive the updated information.

While methods and systems embodying the present invention are shown by way of example, it will be understood that the invention is not limited to these embodiments. The methods and systems described are merely examples of the invention, the limits of which are set forth in the claims which follow. Those skilled in the art may make modifications, particularly in light of the foregoing teachings.

We claim:

1. A system for securing and filtering calendar events for selective publication, the system comprising:
 a processor; and
 a memory having computer-executable instructions stored thereon, wherein the computer-executable instructions are configured for:
  receiving a publication selection for calendar events on a client device;
 in response to receiving the publication selection, accessing an interface having selective publication options, wherein the selective publication options include: a published details option, wherein the published details option includes an option for setting availability status related to the calendar events without including text of the calendar events, and an option for setting access to a first portion of the calendar events and restricting a second portion of the calendar events,
 a business hours option, wherein the business hours option includes an option for setting a preset time period within a day interval to allow access to calendar events in the preset time period and restrict access to calendar events outside the preset time period;
 a privacy option, wherein the privacy option includes an option for restricting access to details of calendar events marked as private;
 an upload option, wherein the upload option includes an option that causes automatic upload upon receiving a modification to the selective publication options, an option that causes automatic upload upon receiving a modification to the calendar events, an option that causes automatic upload upon receiving a rolling forward of a current time interval, and an option for causing manual upload upon receiving an upload selection, and
 an update limit option, wherein the update limit option includes an option for restricting publication of calendar events in accordance with a server limit;
 setting at least one of the selective publication options;
 setting individual access security levels for each one of a plurality of viewers;
 setting a rolling time window for publication of calendar events within the rolling time window, wherein the rolling time window includes a plurality of specified durations which access to the transaction in the calendar publication is provided to another, wherein an implied date range created by a plurality of duration shifts at a specified time to create a rolling effect for a shared calendar;
 creating a first version of a calendar that comprises the calendar events according to the selective publication options, the access security level, and the rolling time window, wherein calendar events within the rolling window are contained within the publishable version of the calendar and calendar events outside the rolling window are excluded from the publishable version of the calendar; and
 publishing the calendar that comprises the calendar events, wherein the published calendar events are configured to allow access to each individual viewer according to the selective publication options, wherein the published calendar events are configured to allow access to each individual viewer according to each individual set access security level of each individual viewer; automatically creating a new version of the calendar at predetermined times; and when the new version of the calendar comprises different calendar events as compared to the to the first version automatically republishing the new version of the calendar.

2. The system of claim 1, wherein publishing the calendar events includes publishing the calendar events to a server.

3. The system of claim 1, wherein the interface having selective publication options includes a call-out window.

4. The system of claim 1, wherein setting the rolling time window includes setting a number of days prior to a current day and a number of days following the current day.

5. The system of claim 4, wherein a total number of days in the rolling time window is maintained as the current day advances.

6. The system of claim 4, wherein the rolling time window advances in accordance with advancement of the current day.

7. A computer-implemented method for securing and filtering calendar events for selective publication, the computer implemented method comprising:
 receiving a publication selection for calendar events of a calendar on a client device; in response to receiving the publication selection, accessing an interface having selective publication options, wherein the selective publication options include:
 a published details option, wherein the published details option includes at least one member of a group comprising: an option for setting availability status related to the calendar events without including text of the calendar events, and an option for setting access to a first portion of the calendar events and restricting a second portion of the calendar events,
 a business hours option, wherein the business hours option includes an option for setting a preset time period within a day interval to allow access to calendar events in the preset time period and restrict access to calendar events outside the preset time period;
 a privacy option, wherein the privacy option includes an option for restricting access to details of calendar events market as private;
 an upload option, wherein the upload option includes: an option that causes automatic upload upon receiving a modification to the selective publication options, an option that causes automatic upload upon receiving a modification to the calendar events, an option that causes automatic upload upon receiving a rolling forward of the current time interval, and an option for causing manual upload upon receiving an upload selection, and
 an update limit option, wherein the update limit option includes an option for restricting publication of calendar events in accordance with a server limit;
 setting at least one of the selective publication options;
 setting individual access security levels for each one of a plurality of viewers;
 setting a rolling time window for publication of calendar events within the rolling time window, wherein setting the rolling time window includes setting a number of days prior to a current day and a number of days following the current day, said rolling time window includes a plurality of specified durations which access to the transaction in the calendar publication is provided to another, wherein an implied date range created by a plurality of duration shifts at a specified time to create a rolling effect for a shared calendar;
 creating a first version of a calendar that comprises the calendar events according to the selective publication options, the access security level, and the rolling time window, wherein the published calendar events are configured to allow access to each individual viewer according to the at least one selective publication option, wherein the published calendar events are configured to allow access to each individual viewer according to each individual set access security level of each individual viewer, wherein calendar events within the rolling window are published and calendar events outside the rolling window are not published; and
 automatically creating a new version of the calendar at predetermined times; and when the new version of the calendar comprises different calendar events as compared to the first version automatically republishing the new version of the calendar.

8. The computer-implemented method of claim 7, wherein publishing the calendar events includes publishing the calendar events to a server.

9. The computer-implemented method of claim 7, wherein the interface having selective publication options includes a call-out window.

10. The computer-implemented method of claim 7, wherein a total number of days in the rolling time window is maintained as the current day advances.

11. The computer-implemented method of claim 7, wherein the rolling time window advances in accordance with advancement of the current day.

12. A non-transitory computer readable storage medium having computer executable instructions for securing and filtering calendar events for selective publication, the instructions comprising:
 receiving a publication selection for calendar events of a calendar on a client device; in response to receiving the publication selection, accessing an interface having selective publication options, wherein the selective publication options include an upload option that includes an option that causes automatic upload upon receiving a modification to the selective publication options, an option that causes automatic upload upon receiving a modification to the calendar events, an option that causes automatic upload upon receiving a rolling forward of the current time interval, and an option for causing manual upload upon receiving an upload selection and at least one other member of a group comprising:
 a published details option, wherein the published details option includes at least one member of a group comprising:
 an option for setting availability status related to the calendar events without including text of the calendar events, and an option for setting access to a first portion of the calendar events and restricting a second portion of the calendar events,
 a business hours option, wherein the business hours option includes an option for setting a preset time period within a day interval to allow access to calendar events in the preset time period and restrict access to calendar events outside the preset time period;
 a privacy option, wherein the privacy option includes an option for restricting access to details of calendar events market as private; and
 an update limit option, wherein the update limit option includes an option for restricting publication of calendar events in accordance with a server limit;
 setting at least one of the selective publication options;
 setting individual access security levels for each one of a plurality of viewers;
 setting a rolling time window for publication of calendar events within the rolling time window, wherein the rolling time window includes a plurality of specified durations which access to the transaction in the calendar publication is provided to another, wherein an implied date range created by a plurality of duration shifts at a specified time to create a rolling effect for a shared calendar;

publishing the calendar events according to the at least one selective publication options, the access security level, and the rolling time window, wherein the published calendar events are configured to allow access to each individual viewer according to the at least one selective publication option, wherein the published calendar events are configured to allow access to each individual viewer according to each individual set access security level of each individual viewer, wherein calendar events within the rolling window are published and calendar events outside the rolling window are not published; and automatically creating a new version of the calendar at predetermined times; and when the new version of the calendar comprises different calendar events as compared to the first version automatically republishing the new version of the calendar.

13. The non-transitory computer readable storage medium of claim 12, wherein publishing the calendar events includes publishing the calendar events to a server.

14. The non-transitory computer readable storage medium of claim 12, wherein the interface having selective publication options includes a call-out window.

15. The non-transitory computer readable storage medium of claim 12, wherein setting the rolling time window includes setting a number of days prior to a current day and a number of days following the current day.

16. The non-transitory computer readable storage medium of claim 15, wherein a total number of days in the rolling time window is maintained as the current day advances.

17. The non-transitory computer readable storage medium of claim 15, wherein the rolling time window advances in accordance with advancement of the current day.

* * * * *